United States Patent [19]

Takagi et al.

[11] Patent Number: 5,243,533
[45] Date of Patent: Sep. 7, 1993

[54] TOOL ABNORMALITY DETECTING DEVICE

[75] Inventors: Shigeyoshi Takagi, Fukuroi; Tokio Ueda, Iwata; Masahiro Takagi, Hamakita, all of Japan

[73] Assignee: NTN Corporation, Osaka, Japan

[21] Appl. No.: 674,993

[22] Filed: Mar. 26, 1991

[30] Foreign Application Priority Data

Mar. 26, 1990 [JP] Japan ................................. 2-78356
Oct. 22, 1990 [JP] Japan ................................. 2-285509

[51] Int. Cl.⁵ .................... G06F 15/46; G05B 23/02
[52] U.S. Cl. .............................. 364/474.17; 364/507; 364/511; 364/185; 318/565
[58] Field of Search ............ 364/474.17, 508, 551.02, 364/184, 185, 507, 511; 318/565

[56] References Cited

U.S. PATENT DOCUMENTS

| | | | |
|---|---|---|---|
| 4,456,960 | 6/1984 | Wakai | 364/507 |
| 4,471,444 | 9/1984 | Yee et al. | 364/551.02 |
| 4,514,797 | 4/1985 | Begin | 364/148 |
| 4,519,040 | 5/1985 | Brankamp et al. | 364/474.17 |
| 4,536,849 | 8/1985 | Borisch et al. | 364/550 |
| 4,642,618 | 2/1987 | Johnson et al. | 340/683 |
| 4,713,770 | 12/1987 | Hayes et al. | 364/474.17 |
| 4,723,219 | 2/1988 | Beyer et al. | 364/474.17 |
| 4,724,524 | 2/1988 | Thomas et al. | 364/474.17 |
| 4,748,554 | 5/1988 | Gebauer et al. | 364/474.17 |

*Primary Examiner*—Jerry Smith
*Assistant Examiner*—Paul Gordon
*Attorney, Agent, or Firm*—Nikaido, Marmelstein, Murray & Oram

[57] ABSTRACT

A tool abnormality detecting device for a machine tool for machining a work with a machining tool selected according to a machining program. The device has a machining load detector for detecting a load during machining with a machining tool. A memory is provided to store threshold data for judging a tool life, detection starting time data and detection time data for each machining stage carried out with respective machining tools. Further the device is provided with a comparison/judgement unit for judging abnormality of the tool by taking detection data corresponding to the machining tool from the memory and comparing an output value of the machining load detector with a threshold within a detection time set in the detection data.

5 Claims, 7 Drawing Sheets

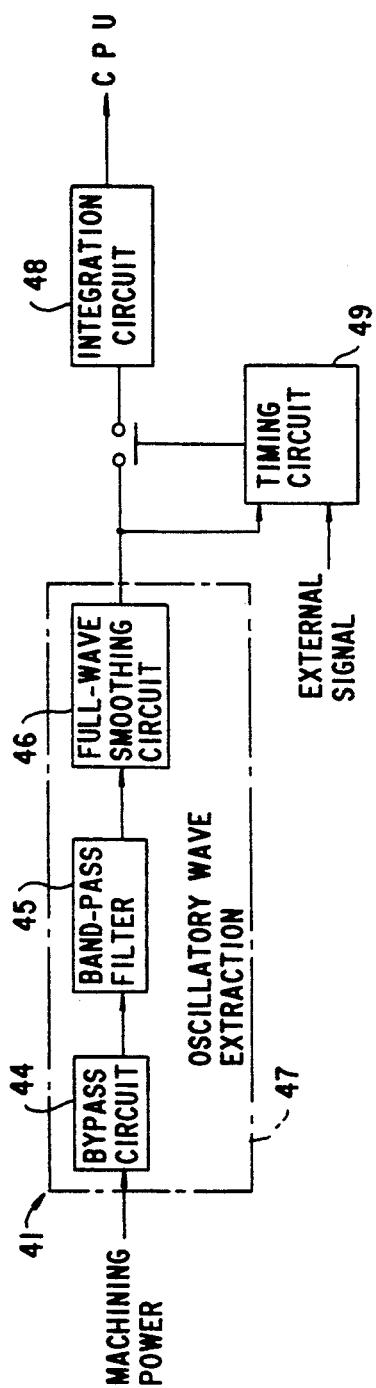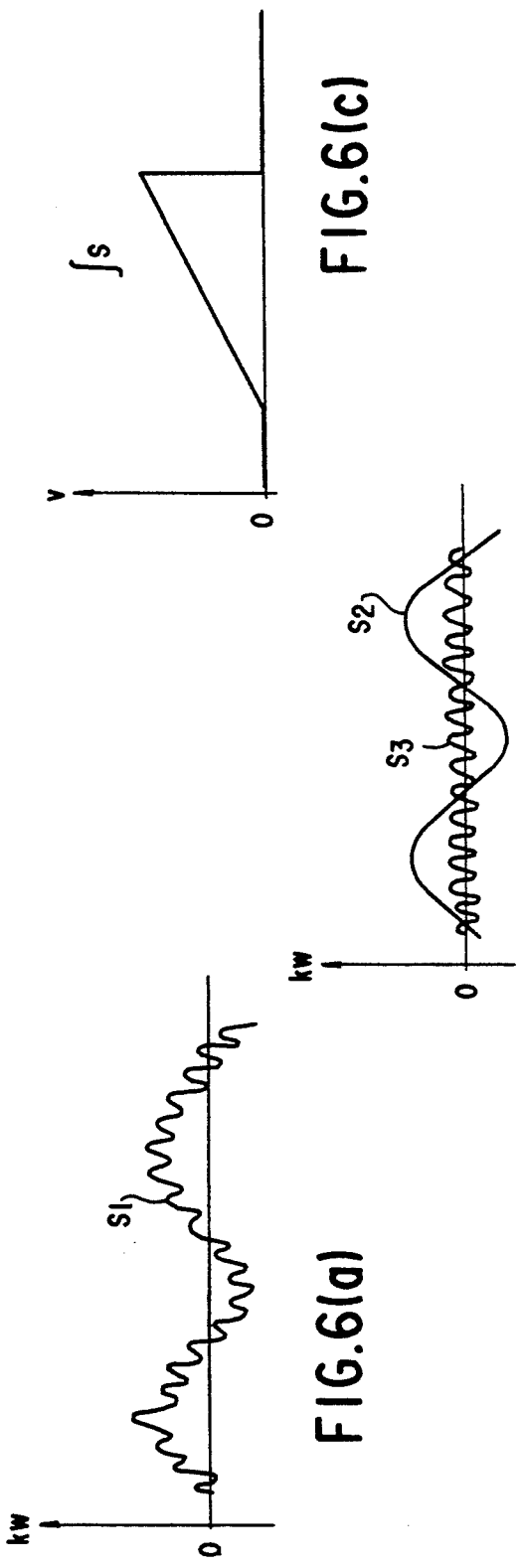

FIG.7
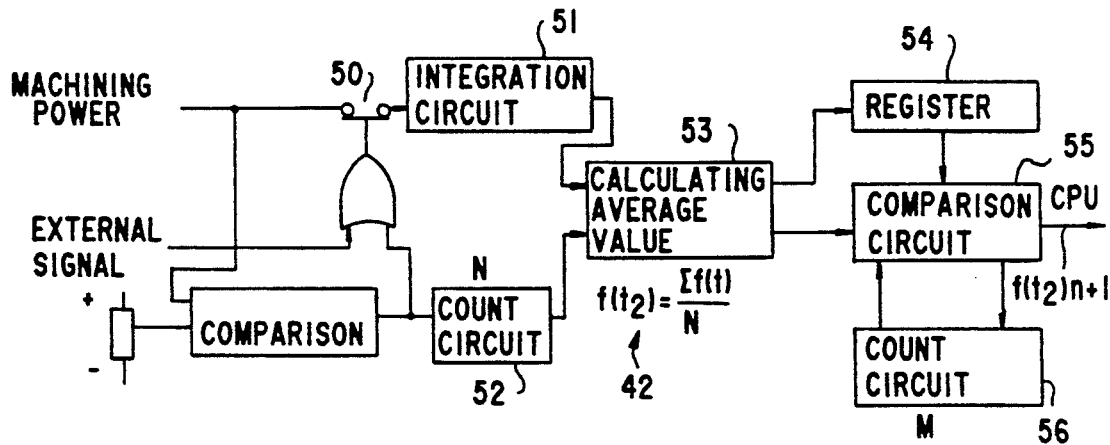
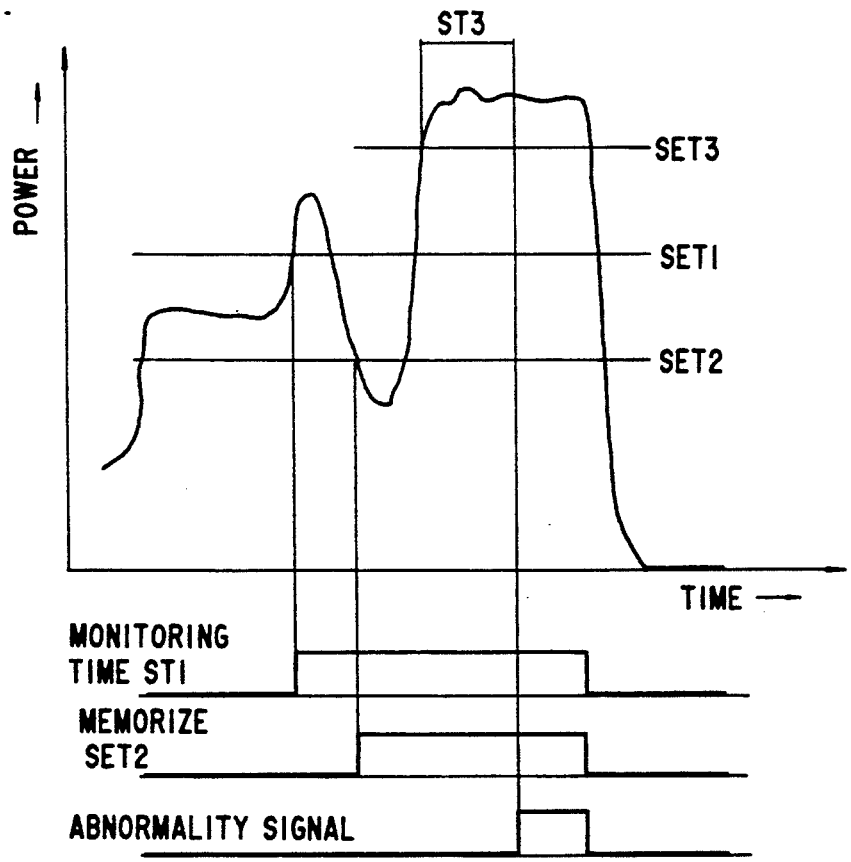
FIG.8

TOOL ABNORMALITY DETECTING DEVICE

This invention relates, in a machine tool for machining works with a plurality of machining tools, to a detecting device for detecting any abnormality of the machining tool.

In a machine tool provided with a plurality of machining tools, such as a machining center or an NC lathe, tools are selected according to a predetermined machining program to carry out machining operation according to the machining conditions preset in the machining program.

In such machining operation, different tools produce different machining loads due to differences in the shape of the work machined and the machining conditions. Even for a single tool, if it is used for machining at a plurality of points, the machining load will change each time the machining shape and machining conditions change for each machining stage.

Heretofore, in a machine tool of this kind, there is known a method for judging abnormality of the tool from the machining load in which a threshold is set beforehand for each machining tool and every time the tool is changed, a threshold corresponding to the newly selected tool is selected according to a tool number signal. Judgement on abnormality of the tool is made by comparing the machining load with the threshold.

But in this conventional method, since only one threshold is set for each tool, in order to apply this threshold to many machining stages, it is necessary to adjust the threshold to the maximum machining load in all the stages. But this will make it impossible to use the threshold for judgement in a light-load machining stage. Thus, the tool cannot be monitored sufficiently.

Also, if the machining conditions change with a change in the machining shape or the revolving speed of the tool while the threshold and the machining load are monitored, it is impossible to change the threshold to a value precisely corresponding to the change in the machining load resulting from the above change. Thus, secure judgement of abnormality is impossible.

For example, as shown in FIG. 3, in machining a work 21 at a plurality of points with a single machining tool 20, if the shape of the work 21 is not uniform due to a tapered surface 22, the machining load changes and thus the threshold has to be changed, too. But in the conventional method, since a single threshold is set for all the machining points, no suitable abnormality judgement was possible.

Further, in actual machining operation, there often appears tool abnormality in which the machining load fluctuates cyclically or non-cyclically but the load magnitude itself does not change very much, or momentary noise waveforms appear in the machining power due to powdery chips. In such a case, it is impossible to stably detect tool abnormality with the conventional method in which the machining load is compared with a fixed threshold.

Namely, in judging the tool abnormality and noise development, it is necessary to provide a function of detecting fluctuations peculiar to the machining load and a function of precisely detecting only an increase in machining load due to tool wear. In the method in which abnormality is detected simply by checking the ON and OFF states of the machining load with respect to the threshold, it is impossible to precisely detect fluctuations and increase in the machining load.

The first object of the present invention is to provide a device which can set a threshold for each machining tool in each machining stage so as to correspond to a machining load value and which can precisely detect any tool abnormality.

The second object of this invention is to provide a tool abnormality detecting device which can detect fluctuations in the machining load and changes in load due to abnormality of the tool and which permits a stable control of wear of the tool.

When the comparison/judgement means receives external signals such as a tool number and a work number from the machine tool, the machining stage to be detected is judged and detection data corresponding to the machining stage are taken from the memory means. When the machine tool begins machining, after a detection starting period has passed, the threshold and the machining load are compared with each other for the detection period.

Since the detection period for the machining load is designated by time, the detection can be made to precisely during the period during which the work is actually machined with the tool on the machine tool.

Also, since a threshold can be set for each machining stage, the machining load in each stage can be compared with a suitable threshold. This makes possible accurate and fine detection of tool abnormality.

If the threshold data are made up of reference values and coefficient data, by setting a threshold reference value for each tool, a plurality of thresholds can be easily set for each machining stage by multiplying the reference value by the coefficient data. This eliminates the need of setting a plurality of thresholds for each stage which are different from those in other stages.

The ON and OFF states of the machining load with respect to a plurality of thresholds are detected at different time points by suitably setting the monitoring period for each threshold. By combining the order thus detected, fluctuations in the machining load can be detected with the lapse of time. Thus, any irregular fluctuations in the machining load can be precisely distinguished.

The load signals during machining are subjected to waveform shaping such as integration, detection of the maximum value and extraction of the oscillatory components. The signals thus processed are compared with the thresholds. By subjecting the load signals to waveform shaping, only increases and fluctuations in the machining load resulting from tool wear can be precisely detected without being affected by momentary changes in the machining load.

Other features and objects of the present invention will become apparent from the following description taken with reference to the accompanying drawings, in which:

FIG. 5 is a block diagram of the oscillatory wave detection circuit of the same;

FIGS. 6a-6c are waveforms showing the process of oscillatory wave detection;

FIG. 7 is a block diagram of the circuit for detecting regions in which the machining power is stable;

FIG. 8 is a waveform showing the detection process in the sequential judgement function;

FIRST EMBODIMENT

Figure 1:
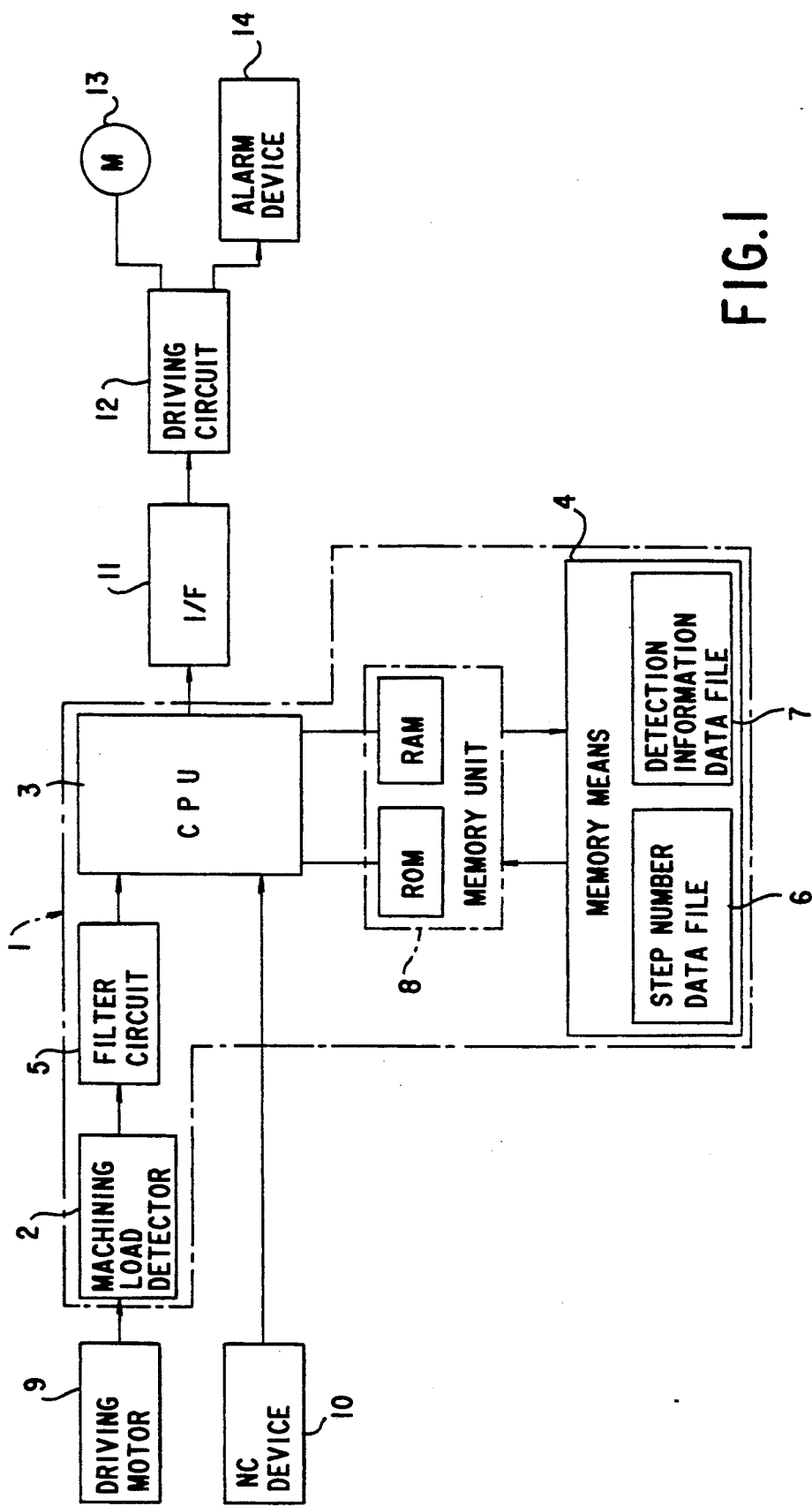
FIG. 1 is a block diagram showing the first embodiment of this invention.

As shown in FIG. 1, a tool abnormality detecting device 1 comprises a machining load detecting means 2 connected to a driving motor 9 of a machine tool, a microcomputer (CPU) 3 as a comparison/judging means and a memory means 4 connected to the CPU 3.

The driving motor 9 is a motor used for machining with the machine tool, such as one for rotating a tool or a spindle and one for driving a feed shaft. The machining load detector 2 is adapted to detect continuously the power consumed by the motor 9 during machining. It may be an electric power detector or a current detector.

To the machining load detector 2 is connected a filter circuit 5 comprising a circuit for removing noise components contained in the consumed power and a circuit for removing the power consumed during no-load conditions (while the motor is idling). Thus the machining power detected by the detector 2 is inputted in the CPU 3 as a power actually consumed for machining.

To the CPU 3, a numerical controller (NC) 10 of the machine tool and the memory means 4 are connected so that data can be exchanged therebetween. The signals from the CPU 3 are applied through an interface 11 to a driving circuit 12 for driving a driving motor 13 and an alarm device 14. The CPU 3 is provided with a memory unit 8 for storing data signals from the memory means 4.

The memory means 4 comprises a step number data file 6 for determining a step number from the work number and tool number and a detection information data file 7 for obtaining detection information at each machining stage.

As shown in Table 1, the step number data file 6 contains step numbers each corresponding to the work numbers and tool numbers. Each step number designates all the machining steps in the machining stage to be carried out on the respective work by the respective machining tool according to the machining program.

TABLE 1

| Work number | Tool number | | | | |
|---|---|---|---|---|---|
| | 1 | 2 | 3 | 4 | 5 |
| 1 | Step 1 | Step 2 | Step 3 | Step 4 | Step 5 |
| 2 | Step 1 | Step 2 | Step 3 | Step 4 | Step 5 |
| 3 | Step 1 | Step 2 | Step 3 | Step 4 | Step 5 |
| 4 | Step 1 | Step 2 | Step 3 | Step 4 | Step 5 |
| 5 | Step 1 | Step 2 | Step 3 | Step 4 | Step 5 |

TABLE 2

| Step number | Stage number | | | | | |
|---|---|---|---|---|---|---|
| | 1 | | 2 | | 3 | |
| 1 | Threshold | | Threshold | | Threshold | |
| | Timer T1 | Timer T2 | Timer T1 | Timer T2 | Timer T1 | Timer T2 |
| 2 | Threshold | | Threshold | | Threshold | |
| | Timer T1 | Timer T2 | Timer T1 | Timer T2 | Timer T1 | Timer T2 |
| 3 | Threshold | | Threshold | | Threshold | |
| | Timer T1 | Timer T2 | Timer T1 | Timer T2 | Timer T1 | Timer T2 |

TABLE 2-continued

| Step number | Stage number | | | | | |
|---|---|---|---|---|---|---|
| | 1 | | 2 | | 3 | |
| 4 | Threshold | | Threshold | | Threshold | |
| | Timer T1 | Timer T2 | Timer T1 | Timer T2 | Timer T1 | Timer T2 |

On the other hand, as shown in Table 2, the detection information data file 7 contains detection data for each step number and stage number.

This file contains detection data for each stage carried out by the respective tool in each step. When the step number and the stage number are designated by the CPU 3, the detection data corresponding to the stage number designated is put into the memory unit 8 in the CPU 3.

The detection data comprises a threshold for judging the life of each tool and time data for determining the detection timing and detection time. The tool life judging threshold is set as a machining load multiplied by a predetermined coefficient. The machining load for determining the threshold is calculated from the consumed power when a work is test-machined.

A plurality of thresholds may be set by changing the coefficient. The advantage of setting a plurality of thresholds is that the tool can be checked at the same time for a plurality of detection objects such as normal wear, micro-chipping and large-scale damage such as breakage of the tool. This makes a delicate judgement possible.

Figure 2:
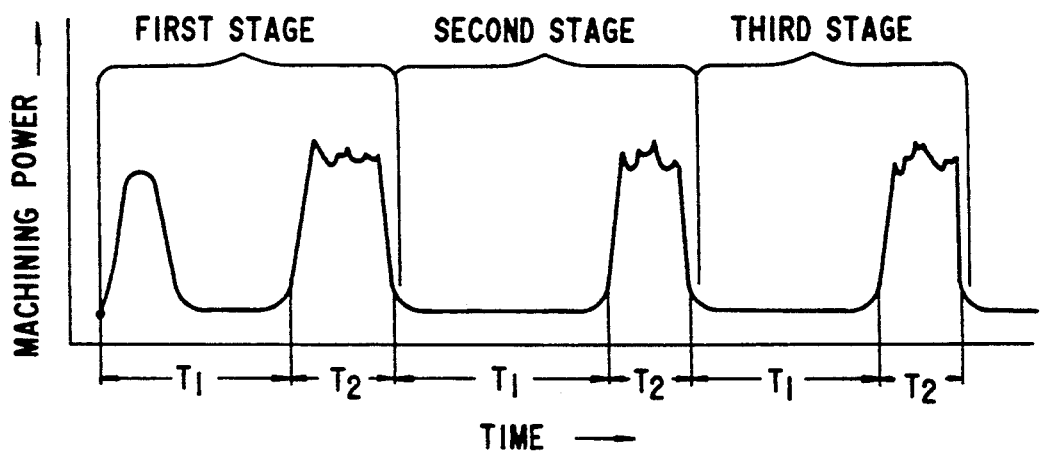
FIG. 2 is a graph showing the ranges within which the time data are set.
Figure 3:
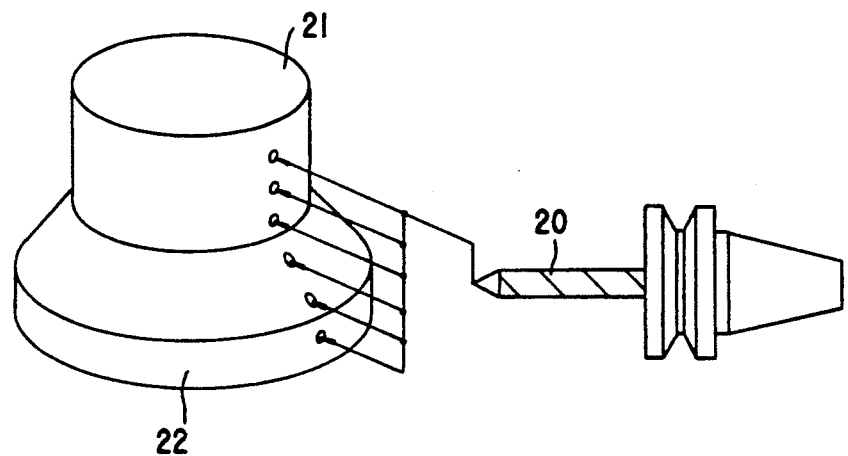
FIG. 3 is a perspective view showing a work and its machining stage.

The above-described time data comprises detection start time (timer T1) and detection time (timer T2). As shown in FIG. 2, the above two time factors are so set that only the actual machining power by which the tool actually cuts into a work will be detected. Namely, the detection time (timer T2) is set from the time when the machining starts and the machining power begins to rise to the time when the machining is complete and the power drops to a level close to the no-load condition. The detection starting time (timer T1) is set from the time when the detection time (timer T2) in the previous stage has ended (in case of the initial stage, from the start of machining in the machining program or from the point of time when a command to change tools is given) to the point of time when the machining in the next stage begins.

By setting the detection timing in terms of time, the detection time will coincide precisely with the actual machining. This is because on a machine tool with an NC device whose mechanical motions such as tool exchange and spindle rotation are controlled according to a machining program, since the intervals between the respective steps and stages and their run times are determined precisely by the machining program, the detection time can be put into coincidence with the actual machining by adjusting the time values to the intervals and run times determined on the program.

Such time data (timer T1, timer T2) may be calculated based on the machining program contained in the NC device 10. Or else, they may be determined by doing a test machining as in the setting of the thresholds, sampling the machining power at different time points and calculating the time data from the results of sampling.

Now the operation of the detecting device of the first embodiment will be described.

When tools or works are exchanged in the machine tool, the number of the newly selected tool and the number of the work to be machined are separately or simultaneously supplied from the NC device 10 to the CPU 3.

Upon receiving these signals, the CPU 3 will designate the tool number or the work number in the step number data file 6 in the memory means 4 to select the corresponding step number. Then it will designate the thus selected step number in the detection information data file 7 to read out all the corresponding detection data to store them in the memory unit 8. These actions are carried out while tools and works are being exchanged.

When machining at the first stage starts in the machine tool with the newly selected tool, the CPU 3 will begin to monitor the first-stage machining. For monitoring, after the time T1 has passed from the point of time when the machining power detected by the machining load detector 2 is inputted in the CPU 3, the machining power will be compared with the thresholds set by the time data until the time T2 has passed.

When the time T2 has passed, the CPU 3 will judge that the first-stage monitoring has ended and begin without interruption the second-stage monitoring. Then the threshold and the time value in the memory unit 8 of the CPU 3 will be switched to data for the second stage stored in the detection information data file. Thus, in the same manner as for the first stage the threshold and the machining power will be compared with each other after the time T1 has passed and until the time T2 has passed. When the monitoring in the second stage ends, the third, fourth and subsequent stages are monitored one after another without interruption.

When all the machining stages for one tool end, the number of the tool newly selected by a signal commanding change of tools will be inputted in the CPU 3 from the NC device 10. Upon receiving this signal, the CPU 3 will draw out of the memory means 4 the step number and the detection data corresponding thereto based on the tool number. Thus, the threshold and the time value in the memory unit 8 of the CPU 3 are replaced with the detection data for the new step number. The CPU 3 now monitors the machining power based on the new detection data.

The operations are carried out in a similar manner if the work is changed. Namely, a signal representing the number of the work thus changed and a signal representing the number of the tool for carrying out the first machining are inputted in the CPU 3 from the NC device 10. The CPU 3 will take from the memory means 4 a step number and detection data based on the abovesaid signals and carry out monitoring.

Thus, the machining load and the threshold are compared with each other only during the actual machining time for every machining stage for all the works and all the tools to detect any abnormality of the tool.

Judgement on tool abnormality by CPU 3 is made when the machining power exceeds the threshold, by determining the form of abnormality based on the kind of the threshold which the power exceeded and the number of times of power exceeded the threshold. For example, in urgent situations such as breakage of the cutting edge, the CPU 3 will give a signal to the driving circuit 12 to control the motor 13 and to change the number of revolutions or the depth of cut of the machine tool or to actuate the alarm device 14.

If the situation is judged to be not so urgent such as in case of normal wear, the number of times the machining power exceeded the threshold is memorized and a signal is given if the accumulated number of times exceeds a predetermine value.

In the above embodiment, the step number is selected based on the work number and the tool number outputted by the NC device 10. But an external signal such as a binary code may be used to directly designate a step number in the CPU 3.

In the detection information data file 7, the same number of stages are set for each step number. But they may not necessarily be the same but may be increased or decreased according to the number of machining points for each tool.

SECOND EMBODIMENT

Figure 4:
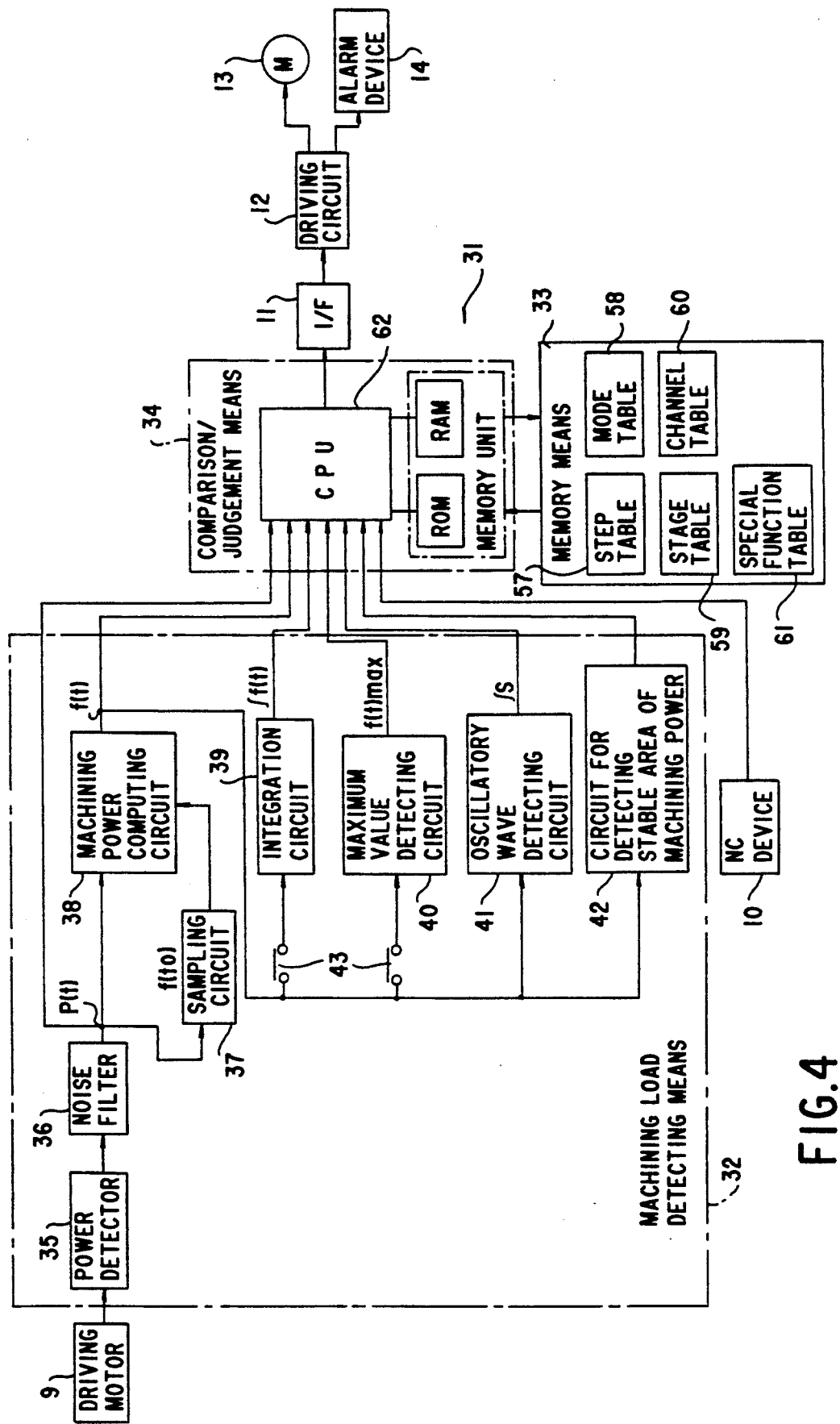
FIG. 4 is a block diagram showing the second embodiment.

FIGS. 4–10 show the second embodiment. As shown in FIG. 4, the abnormality detecting device 31 of this embodiment comprises a machining load detecting means 32, a memory means 33 and a comparison/judgement means 34. Its basic structure is the same as in the first embodiment. Differences lie in that a circuit for waveform processing such as integration of the machining power signal or the detection of its maximum value is provided in the detecting means 32 and that the memory means 33 contains not only step number data and detection information data but also data for determining the kinds of the waveforms inputted and data having special functions. Owing to these differences, the comparison/judgement means 34 has different control functions from that in the first embodiment.

First, the machining load detecting means 32 has a sampling circuit 37 for holding the power in the no-load state f(to) from the consumed power P(t) obtained through a power detector 35 and a noise removing filter 36, and a computing circuit 38 for calculating the machining power f(t) by subtracting the sampled no-load power f(to) from the consumed power P(t). To the computing circuit 38, a plurality of circuits are connected for processing waveforms of the signal representative of the machining power f(t) thus obtained. This waveform processing circuit comprises an integration circuit 39 for integrating the waveforms of the machining power f(t), a maximum value detecting circuit 40 for detecting the maximum value, an oscillatory wave detecting circuit 41 for picking up oscillatory wave components, and a detecting circuit 42 for detecting an area where the machining power is stable.

Both the integration circuit 39 and the maximum value detecting circuit 40 have gate circuits 43 adapted to be opened or closed when either a signal inputted from outside or one produced internally by detecting the machining power is inputted at the start and end of machining, so as to process waveforms only during machining.

As shown in FIG. 5, the oscillatory wave detecting circuit 41 has an oscillatory wave extracting circuit 47 comprising a high-pass circuit 44, a band-pass filter 45 and a full-wave rectification and smoothing circuit 46. Further, it has an integration circuit 48 and a timing circuit 49 for opening and closing a gate provided between the oscillatory wave extracting circuit 47 and the integration circuit 48.

The direct current components are removed from the machining power in the high-pass circuit 44 of the extracting circuit 47 as shown in FIG. 6a. Then, from the oscillatory wave components S1 obtained, oscillatory waves (S2, S3) having necessary frequencies are extracted by changing the band-pass frequency of the band-pass filter 45 as shown in FIG. 6b. These oscillatory waves are subjected to full-wave smoothing and outputted.

The integration circuit 48 carries out integration $\int s$ on the oscillator waves outputted by the extraction circuit 47 within the time preset in the timing circuit 49 according to the machining time. The output waveform is as shown in FIG. 6c.

On the other hand, if the machining power fluctuates violently, e.g. at the beginning of drilling, it is difficult to stably compare the power with a constant threshold. The circuit 42 for detecting a stable region of the machining power detects a moment where the machining power becomes stable and determines a suitable threshold value.

As shown in FIG. 7, the detecting circuit 42 comprises a gate circuit 50 adapted to be opened and closed according to the machining time and an integration circuit 51 for integrating the machining power signal waveforms. To the integration circuit 51 is connected an average value calculating circuit 53 for calculating an average value of the integrated value $f(t2) = \Sigma \int f(t)/N$ from the average number of times N given as the number of times of machining from a count circuit 52 and the total of the integrated values inputted from the integration circuit 51. Also, a register 54 and a comparison circuit 55 are connected to the average value calculating circuit 53. To the comparison circuit 55 is connected a count circuit 56.

In this arrangement, the average value calculating circuit 53 counts the signals inputted from the count circuit 52. Every time the count reaches a predetermined number of times (N), which is 2 or larger, the total $\Sigma f(t)$ of the integrated values inputted is divided by the average number (N). The average value thus obtained is outputted to the register 54 and the comparison circuit 55.

When the register 54 receives from the calculating circuit 53 an average value signal (suppose this signal is the n-th one and put it as $f(t2)n$, it will memorize this value temporarily. When the next average value $(f(t2)n+1)$ is inputted, the previous average value $(f(t2)n)$ is fed to the comparison circuit 55 and the newly inputted average value $(f(t2)n+1)$ is stored. This operation is repeated every time a signal is inputted from the average value calculating circuit 53.

The comparison circuit 55 memorizes one after another the average values $f(t2)n$, $f(t2)n+1$ inputted from the average value calculating circuit 53 and compares the absolute value of the difference between the newest average value $f(t2)n+1$ and the previous average value $f(t2)n$, i.e. $|a|$ $(= |f(t2)n+1-f(t2)n|)$ with a predetermined permissible value b. If the absolute value decreases below the permissible value b, it outputs a signal to the count circuit 56.

In the count circuit 56, a number (M) which is 2 or larger is memorized beforehand. When the signals inputted from the comparison circuit 55 reach the number (M), the count circuit 56 outputs a signal to the comparison circuit 55.

When the comparison circuit 55 receives the calibration signal from the count circuit 56, it outputs the average value $f(t2)n+1$ stored in the memory unit to the CPU 62 to calibrate the reference value of the threshold.

By the time the average value for calibration is outputted from the comparison circuit 55, the fluctuation in the average value of the machining power will be kept within a predetermined range, i.e. the machining power will be in a stable region. Thus in CPU 62 the comparison and judgement can be made stably by setting the last average value as the reference value of the threshold.

In this embodiment, the detecting circuit 42 has its own integration circuit 51. But the signals from the integration circuit 39 shown in FIG. 4 may be used. Also, as the signal for detecting a stable region, the maximum value $f(t)max$ may be used.

As shown in FIG. 4, the memory means 33 contains five data tables, i.e. a step table 57, a mode table 58, a stage table 59, a channel table 60 and a special function table 61.

As shown in Table 3, the step table 57 contains specific step conditions corresponding to the respective work numbers (0 numbers) and the respective tool numbers (T numbers) as with the step number data file 6 in the first embodiment. But these step conditions are not merely step numbers but contain a plurality of other data.

Namely, the step table 57 contains on a matrix selected by designating 0 number and T number a mode number used (the number of the mode table 58 where the detecting conditions corresponding to the machining conditions are stored), a reference value of the threshold (a reference value for each SET value (threshold) when a work is machined with a tool designated by T number at a 100% load power), a stage number at the beginning of detection and a stage number at the end of detection (number of the stage table 59 setting the detecting time and threshold), and data indicating whether or not there is a repeat function (a function of repeating a specified stage number) and whether or not there is a special function. By selecting specific O and T numbers, all of the above-mentioned data are read into the CPU 62.

TABLE 3

| | | O Number | | | | | |
|---|---|---|---|---|---|---|---|
| | | 0 | ... | | | ... | 31 |
| T Number | 0 | | | | | | |
| | . | | | | | | |
| | . | | | | | | |
| | . | | | | | | |
| | 7 | | | Mode | Reference value | Repeat function | |
| | | | | Start stage | End stage | Special function | |
| | . | | | | | | |
| | . | | | | | | |
| | 31 | | | | | | |

On the other hand, as shown in Table 4, the mode table 58 contains various conditions necessary for the detection of abnormality for each mode number. By selecting a mode number corresponding to the step conditions in the step table, the above conditions are read out simultaneously.

The conditions stored in the mode table 58 include data for selecting the kind of the power to be compared with the threshold (such as consumed power, machining power, integrated value or maximum value), data on rush-cut time for cutting the rise in power when the motor is started, which can be an obstacle in detecting wear of the tool, and data on delay time of hold or correction value in sampling the no-load power.

Also stored in the mode table 58 are data for determining whether to command the timing for starting the machining stage for monitoring the machining period from outside, or to command it by internally detecting the level of machining power, or to keep on monitoring during operation, data on command as to which to use for the below-mentioned four thresholds (SET1-SET4) over-detection (upper limit) or under-detection (lower limit), data for setting the time for monitoring the change of the above values from OFF to ON, and data for changing over the input gain of a current sensor in the power detector 35.

reference values for the thresholds set in the step table 57. Therefore, in this embodiment, once the load power is calculated for each tool by actually machining a work on trial, a plurality of thresholds can be set for every machining stage simply by suitably setting the coefficient data in the channel table 60. This eliminates the need for setting a plurality of different thresholds for different machining stages, thus permitting a considerable reduction of the data setting work. Another advantage is that the threshold values can be easily changed by changing the coefficient values.

These four thresholds (SET1-SET4) are used for the detection of contact between the tool and the work (upper limit), for the detection of wear on the tool (upper limit), for the detection of breakage of the tool

TABLE 4

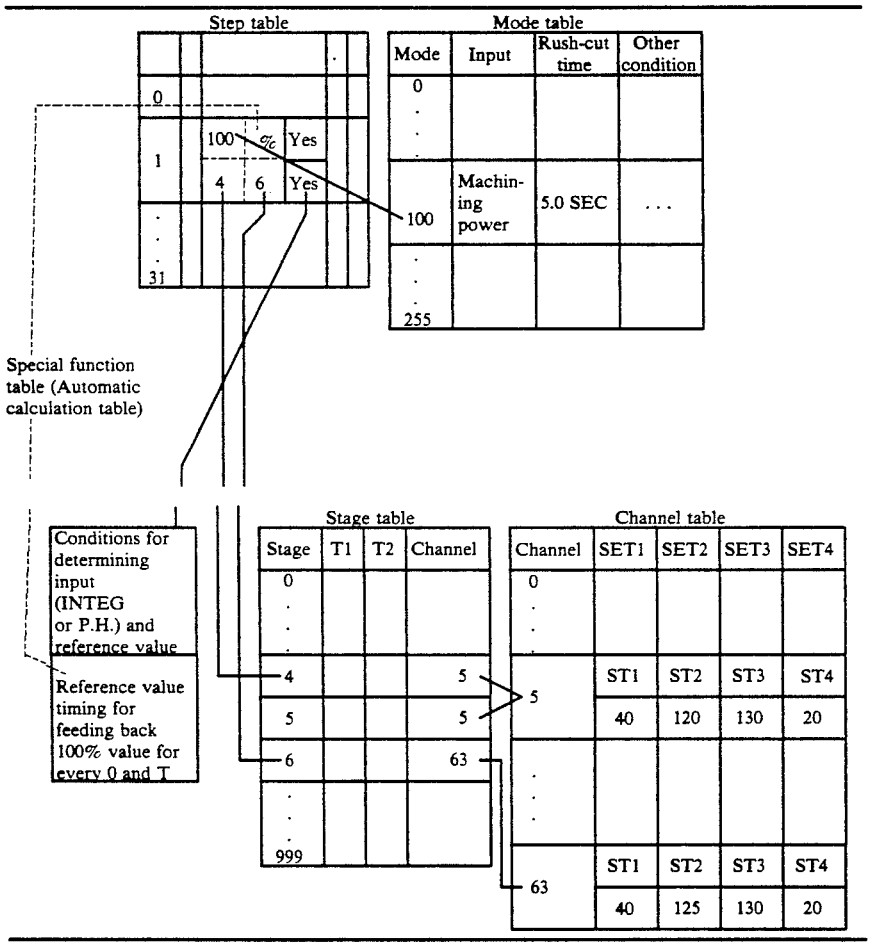

The stage table 59 and the channel table 60 correspond to the detection information data file 7 in the first embodiment but are capable of accommodating a wider range of data. Namely, it contains a detection starting time (timer T1), a detection time (timer T2) and a channel number of each stage number, while the channel table 60 contains, for each channel number, coefficient data 40, 120, 130 . . . for setting thresholds with the four levels (SET1-SET4) as one set, and data on monitoring time (timer ST) for determining the monitoring time for each threshold.

The coefficient data represent percentage values with respect to the reference values in the step table 57. Four different thresholds can be set for each machining stage by multiplying the coefficient for each channel by the (upper limit) and for the detection of breakage of the tool (lower limit).

The monitoring time data (timer ST), which are set corresponding to the coefficient data in the channel table 60, are used in the below-described special function. Thus the description will be made in connection with the special function.

The repeat function set in the step table 57 is a function for repeatedly monitoring the machining power under the same stage conditions. This function serves to reduce the number of stages set.

Namely, in the device of this embodiment, the machining power is monitored sequentially over a plurality of stages, the number of which is determined by the starting stage number and the final stage number in the step table 57. But if the machining power to be monitored does not fluctuate so much by continuous machining, there is no need of monitoring for every stage. In such a case, the repeat function is set for successive stage numbers so that the monitoring will be repeated for the respective stage numbers thus set.

In this embodiment, the step table 57 further contains, as special functions, an automatic calculation function, an oscillatory wave detection function and a sequential judgement function.

The automatic calculation function is carried out by use of the above-described circuit 42 to detect a stable region in the machining power. While the same kind of works are repeatedly machined with a single tool, if the initial machining power differs from the value at an intermediate stage before the tool is changed, the above function serves to determine a reference value by the detecting stability of machining power from the results of several machining operations.

If the average value of machining power in a predetermined number of times N is lower than a permissible value over a successive number of times M, it is judged that the machining power has stabilized and the last average value is memorized as the reference value. The reference value set in the step table 57 is automatically calibrated to this average value.

In this case, by suitably setting such conditions as the average number of times and the successive number of times, a certain value of the machining power during trial machining can be regarded as 100% load power to set it as the reference value for the threshold.

For every O number and T number defined in the step table 57, it is determined whether or not to use the automatic calculation function. If used, the time period from the beginning of machining to a certain point of time during machining is set for each work and each tool to feed back the power at this point of time as 100% load power for determining the reference value.

The oscillatory wave detection function serves to judge the fluctuation of the oscillatory wave in the machining power. More specifically, the fluctuating oscillatory wave components which change with wear or chipping or breakage of tool are taken out by use of the oscillatory wave detection circuit 41 and subjected to integration process. If the magnitude of fluctuation exceeds the threshold, it is judged that something is wrong with the tool.

It is judged whether or not to use this oscillatory wave detection function for every O number and T number. If used, a threshold for judging abnormality is set.

The machining power fluctuates in a peculiar way while the tool is in an abnormal state. The sequential judgement function is used to detect such fluctuations.

For example, during drilling operation, if abnormality appears at the tool edge at the initial stage of drilling, the machining power increases first and then reduces as shown in FIG. 8. If the abnormal state of the tool continues thereafter, the once reduced machining power will begin to increase and keep high until the edge is broken.

In order to detect such an abnormal state, as shown in FIG. 8, three thresholds (SET1 (upper limit), SET2 (lower limit), SET3 (upper limit)) are set, together with monitoring time periods (timers ST1 and ST3) which range from the time when the power has exceeded the respective thresholds SET1 and SET3 until abnormality is detected. With this arrangement, if SET1 is turned on and then SET2 is turned on, this indicates that the machining power increased and then reduced. If thereafter SET3 is turned on within the duration of the timer ST1, this indicates that the machining power begins to rise again. If SET3 is kept on for the duration of the timer ST3, which means that the machining power has been increasing continuously, an abnormality signal is given at this point.

By suitably combining the ON and OFF of the machining power with respect to a plurality of thresholds and the order thereof, the fluctuation pattern peculiar to the machining power can be detected, thus making it possible to detect abnormality of the tool.

When utilizing this sequential judgement function, data are selected from the mode table 58 for determining whether the respective thresholds are used for over-detection or under-detection. Further, monitoring time periods (timers ST) corresponding to the respective SET values are read out from the channel table 60.

On the other hand, in the CPU 62 as the comparison/judgement means 34, power consumption P(t) of the driving motor 9, machining power f(t), integrated value $\int f(t)$, maximum value f(t) max, integrated value of the oscillatory wave and feedback signals from the stable region detection circuit 42 are inputted from the machining load detection means 32. The CPU 62 carries out comparison and judgement based on these input signals and the data signals from the memory means 33 and outputs, as a result of judgement, control signals to the driving circuit 12.

Figure 9:
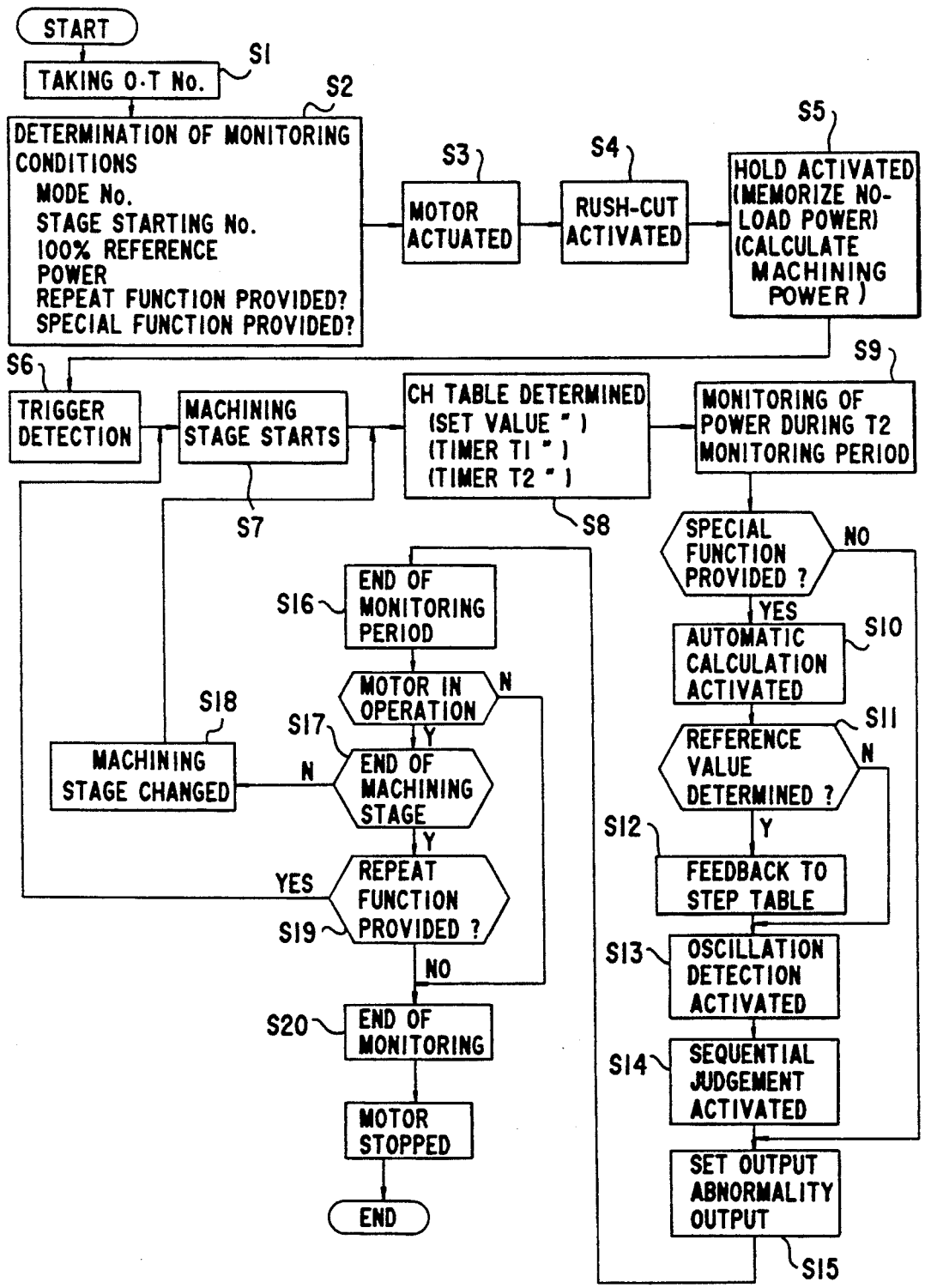
FIG. 9 is a block diagram showing the processing flow in the CPU.
Figure 10:
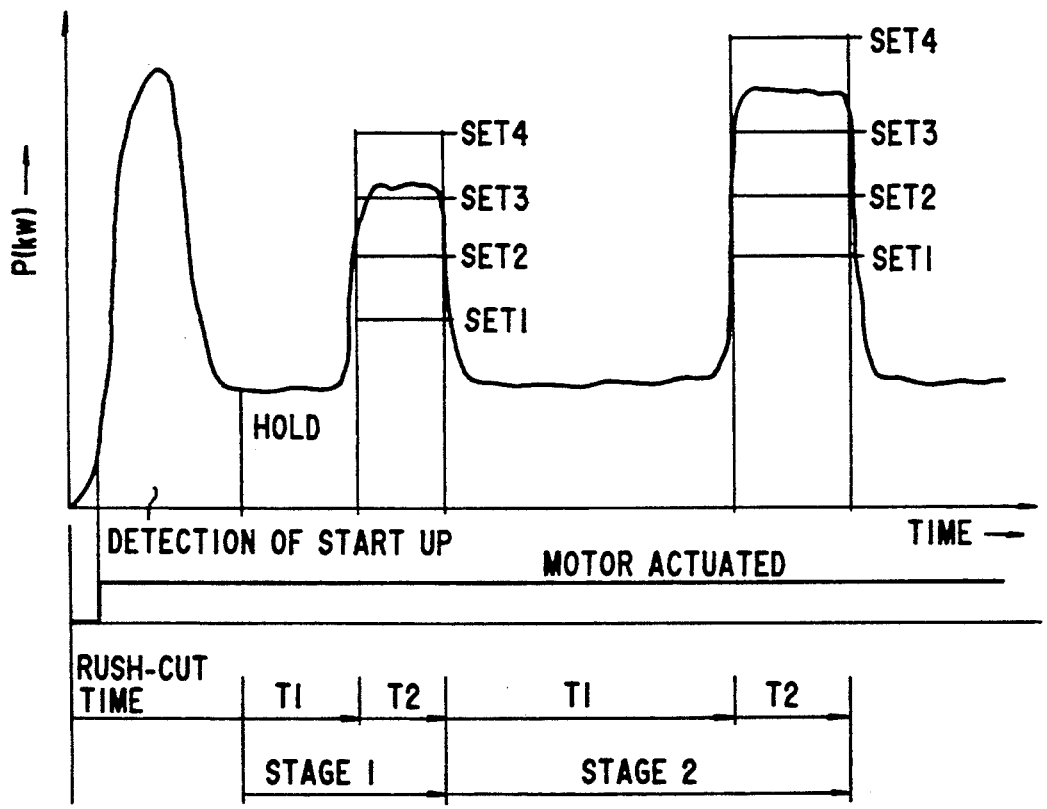
FIG. 10 is a view showing a power waveform obtained as a result of the control by the CPU.

The operation of the abnormality detecting device 31 of the second embodiment will be described based on the control process flow by the CPU 62 shown in FIG. 9.

In Step 1, T number for newly selected tool and O number for the work are taken from the numerical controller 10. In Step 2, these numbers are designated in the step table 57 in the memory means 33 to determine the monitoring conditions.

In determining the monitoring conditions, as shown in Table 4, if for the O number and T number No. 1 is designated, for example, six conditions are simultaneously set from the data stored on its (O, T)=(1, 1) matrix.

Mode table No.=100
Starting stage No.=4
Final stage No.=6
Reference value (100% reference power)=10
Repeat function: Yes
Special function (automatic calculation): Yes Once the above conditions are determined, the driving motor 9 is started in Step 3. In Step 4, in order to cut the starting power of the motor at the time of startup, the period equal to the rush-cut time (5 sec) designated by the mode number 100 in the mode table 57 is cut from the monitoring period.

In Step 5, the no-load power f(to) held in the sampling circuit 37 is memorized. Also, the machining power f(t) given by subtracting the no-load power f(to) from the power consumption P(t) is memorized.

Next, in Step 6, a trigger signal for starting the stage is detected either by external signal or according to the internal level. The kind of the trigger signal is determined by the data stored in the mode table 58.

When the above process is carried out, in Step 7, machining is carried out from the starting stage set in Step 2 and monitoring of the machining power is started according to the monitoring conditions.

Namely, in Step 8, detection starting time (timer T1) and detection time (timer T2) are taken from the stage table 59, while coefficient data corresponding to SET-1-SET4 are taken from the channel table 60 according to the channel number set in the stage table 59. Four thresholds (SET1-SET4) are determined by multiplying the coefficient data by the reference values for the monitoring conditions.

In Step 9, abnormality monitoring is carried out by comparing the machining power with the thresholds within the designated duration of the timer T2. The detection method as to the kind of the power to be monitored (machining load, integrated value, etc.) and whether the thresholds (SET1-SET4) are used for upper-limit detection or lower-limit detection is determined by the data stored in the mode table 58.

If the monitoring conditions include the special function, it is carried out after Step 9.

If the automatic calculation function is provided, calculation is carried out based on the conditions set in the automatic calculation table in the special function table 61 (Step 10). When the reference value is determined, it is fed back to the step table 57 (Steps 11 and 12). In this feedback process, each power value when the reference value is determined (consumed power, machining power, integrated value and maximum value) is fed back to the reference value of the same kind in step table (100% loaded power) to calibrate the current reference value to a new value.

If the oscillatory wave detection function and the sequential judgement function are provided, these functions are carried out one after the other (Steps 13 and 14). These functions, too, are carried out based on the data in a condition table attached to the special function table 61.

If abnormality is detected in the special function, abnormality output is activated, outputting a control signal.

On the other hand, if abnormality is detected in other than the special function, SET output and abnormality output are activated in Step 15.

When the process up to Step 15 is complete, it is judged in Step 16 that the monitoring period has ended. If the monitoring is kept in operation in this state, it is judged in Step 17 whether or not the stage executed is the final stage set in the step table 57. If not the final stage, the monitoring conditions are changed to the conditions for the next stage in Step 18. Then the program returns to Step 8 to repeat the above process. This is repeated until the stage comes to the final stage, i.e. until it reaches the final stage defined in the step table 57, while changing the conditions successively.

When the predetermined stage is complete, if the repeat function is to be used, the program returns to Step 7 to repeat stages from the starting stage until the number of times the stage is repeated reaches a predetermined value (Step 19).

If the repeat function is not used or when the repeat function has ended, it is judged that the monitoring has finished (Step 20). Thus the driving motor is stopped.

What is claimed is:

1. A tool abnormality detecting device for a machine tool for machining a work with a machining tool selected according to a machining program, said device comprising:

machining load detecting means for detecting a machining load during machining with the machining tool;

memory means for storing threshold data for judging a tool life, detection starting time data and detection time data, for each machining stage carried out by each machining tool according to the machining program; and a comparison/judgement means for judging abnormality of the tool by taking detection data corresponding to the machining tool from said memory means and comparing the output of said machining load detecting means with a threshold in said threshold data within a detection time set in said detection time data, wherein each threshold has an upper and a lower limit, and wherein the abnormality is determined by said comparison/judgement means based upon actual cutting power, said actual cutting power being determined by subtracting a power of a motor of the machining tool while not in a machining operation from a power of said motor during machining.

2. A tool abnormality detecting device as claimed in claim 1, wherein said threshold data for judging a tool life comprise reference values preset for said respective machining tools, and coefficient data preset for said respective machining stages and multiplied by said each reference value to determine thresholds.

3. A tool abnormality detecting device as claimed in claim 1 or 2, wherein said threshold data for judging a tool life comprise a plurality of thresholds and monitoring time data for determining the monitoring range for said each threshold.

4. A tool abnormality detecting device as claimed in claim 1 or 2, wherein said machining load detecting means is provided with a waveform processing circuit for processing waveforms of load signals during machining and said memory means contain threshold data corresponding to said waveform processing.

5. A tool abnormality detecting device as claimed in claim 3, wherein said machining load detecting means is provided with a waveform processing circuit for processing waveforms of load signals during machining and said memory means contain threshold data corresponding to said waveform processing.

* * * * *